Aug. 25, 1925.  1,551,435
T. SPEZIO
FENDER
Filed Nov. 11, 1924   3 Sheets-Sheet 1

Thomas Spezio
INVENTOR
BY Victor J. Evans
ATTORNEY

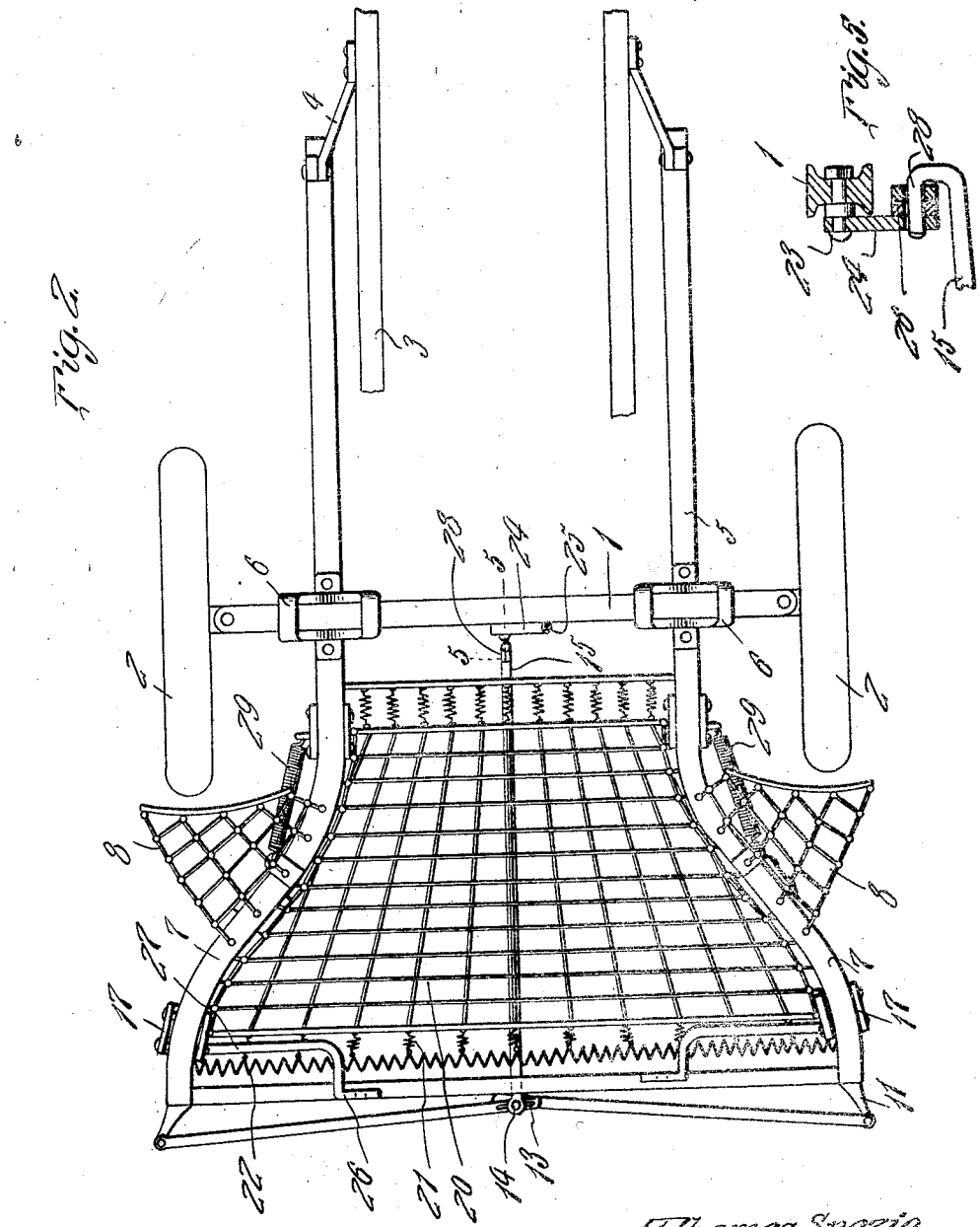

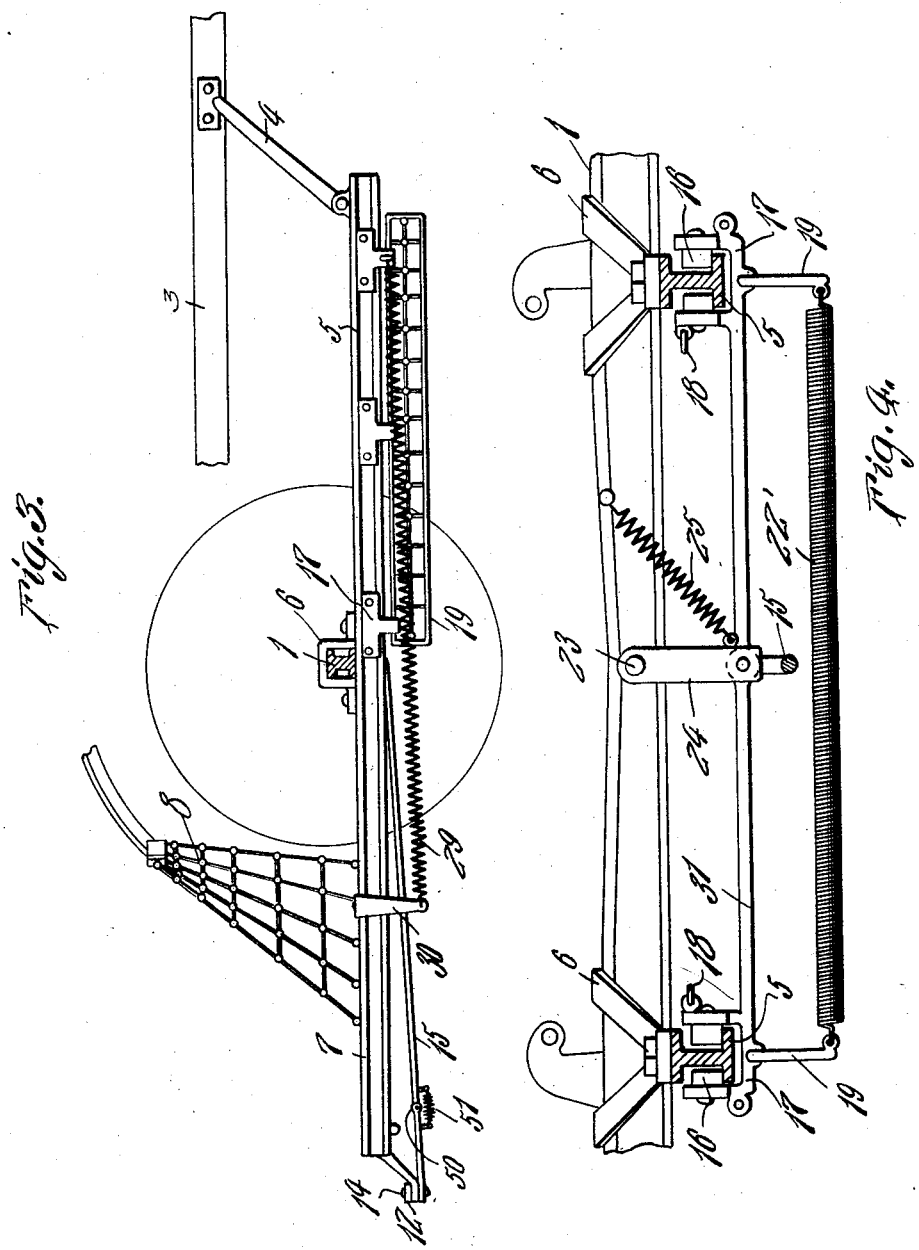

Patented Aug. 25, 1925.

1,551,435

UNITED STATES PATENT OFFICE.

THOMAS SPEZIO, OF ROCHESTER, NEW YORK.

FENDER.

Application filed November 11, 1924. Serial No. 749,262.

*To all whom it may concern:*

Be it known that I, THOMAS SPEZIO, a citizen of the United States, residing at Rochester, in the county of Monroe and State of New York, have invented new and useful Improvements in Fenders, of which the following is a specification.

My present invention has reference to a fender for automobiles or like vehicles.

An object is to provide an automobile with a life and property saving device in the nature of a net which is normally housed and locked beneath the body of the machine and automatically projected outwardly therefrom upon the contact of an obstacle by the machine, so that the said obstacle will be received within the net without danger thereto or to the parts of the automobile.

A still further object is the provision of a life and property saving device for automobiles or like vehicles in the nature of a laterally expansible net having rollers associated therewith traveling on tracks providing the side members of a frame, the said tracks at the outer portions thereof being curved away from each other and supporting thereon wing fenders for the front wheels of the machine, breakable means being provided at the front of the frame which, when contacted, release the holding means for the net, while spring means is provided for moving the net outwardly on the track to receive a person or an obstacle therein and to support the same thereon without liability of damage to the person or to the automobile.

The invention further consists in the construction, combination and operative association of parts such as is disclosed by the drawings which accompany and which form part of this application.

In the drawings:—

Figure 2 is a similar view but showing the net projected to receive a person or obstacle thereon.

Figure 3 is a side elevation of the device, as illustrated in Figure 1.

Figure 4 is a sectional view on the line 4—4 of Figure 1.

Figure 5 is a sectional view approximately on the line 5—5 of Figure 2.

Figure 1:
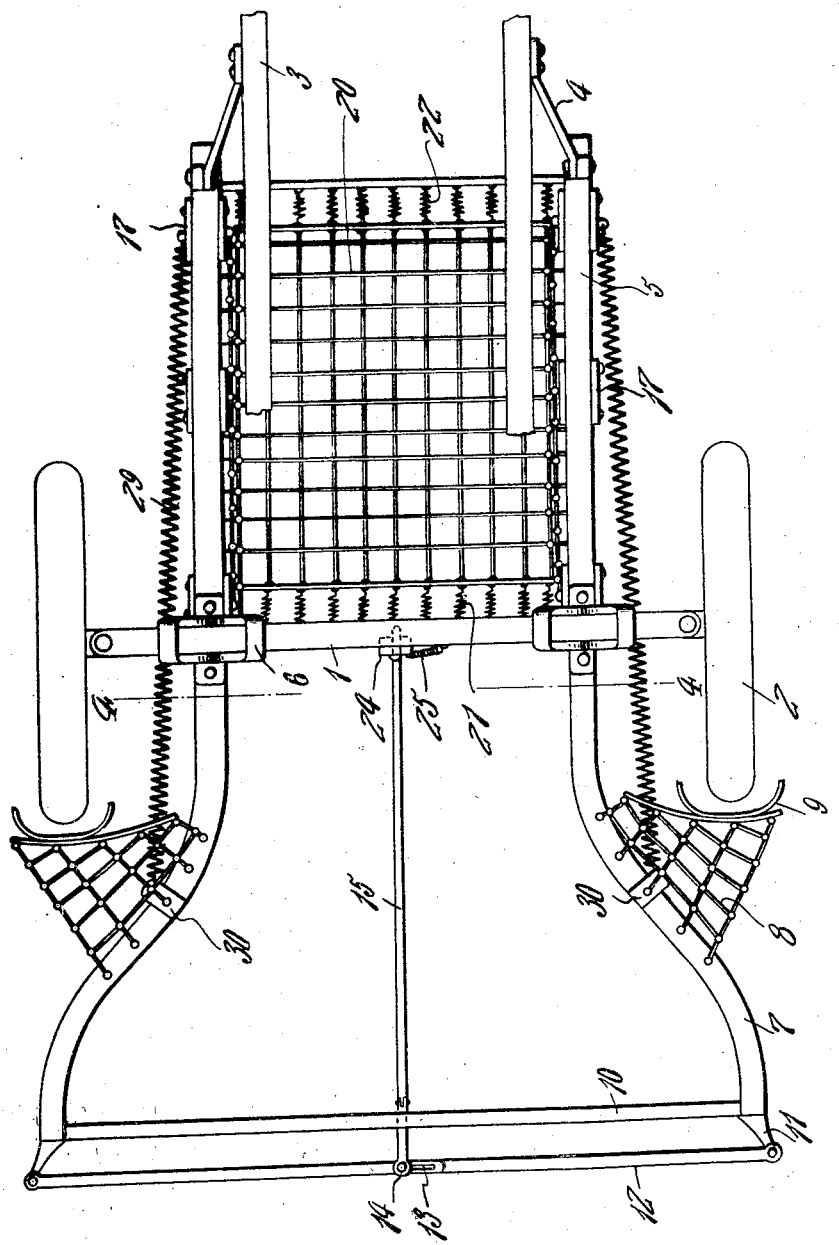
Figure 1 is a top plan view of the forward portion of the frame of an automobile illustrating the application of the improvement thereon.

The front axle of a vehicle, such as an ordinary automobile, is indicated in the drawings by the numeral 1, and the steering wheels therefor by the numeral 2. In the showing of the drawings, only a portion of the frame of the automobile is shown, these constituting the channeled side members 3.

Secured to the side members 3 through the medium of brackets 4 are the side members 5 of the frame that constitutes an important element of the improvement. The side members 5 are in the nature of I beams, and have secured to their upper faces saddle members 6 that straddle the front axle 1. For the major portion of their lengths the side members 5 are straight, but the outer portions thereof are rounded outwardly away from each other, as indicated by the numeral 7. Secured approximately on the center of the said rounded portions 7 there are flexible wing guards 8 that are preferably secured to the mudguards 9 for the front wheels of the machine. The wing guards are to prevent persons or obstacles being thrown under the front wheels should the same fall into the frame and on to the protective net associated therewith. The said net will hereinafter be described in detail.

The front element of the frame is indicated by the numeral 10, and the corners of the frame are provided with outwardly directed lugs 11. To each of these lugs there is pivoted a rod 12. The rods have their confronting ends disposed in lapping relation and provided with elongated slots 13. Passing through these slots 13 there is a pivot member 14 that connects to the rods 12 a locking rod or bar 15 which holds the net normally beneath the body of the automobile in a manner as also will be hereinafter fully set forth.

The side members 5 of the frame are in the nature of tracks, the same having journaled on the lower flanges thereof rollers 16 journaled in the upstanding arms of substantially U-shaped brackets 17. Any desired number of such brackets may be employed and the said brackets are held in proper spaced relation to each other through the medium of flexible means 18. The brackets have secured thereto flexible frame members 19, and to these frame members there is connected the net 20. At both of its ends the net carries spring buffers 21 and 22 respectively, and the frame members 19 at their outer ends are connected together by a helical spring 22'.

Pivotally secured to the center of the axle 1, as at 23, there is a depending arm 24. The arm is influenced toward the axle through the medium of a spring 25, Fig. 4. The arm 24 is centrally provided with an opening that is designed to register with similar openings on the inner and offset ends 26 of arms 27 that are secured to the sides of the front buffer 21 of the net. The ends 26 of the arms 27 are designed for lapping engagement when the net is moved under the body of the car, as illustrated in Figures 1 and 2 of the drawings, and when the arm 24 is swung pendent, the said ends of the arms 26 and 27 will be arranged thereagainst. The member 15 has its free end hooked, as at 28, and this hook is designed to be received through the referred to alined apertures in the arms 24 and 26 and 27.

The net is designed, when pressure is exerted against the bar 12, to bring the hooked end 28 of the member 15 out of the apertures in the arms 24, 26 and 27, to be projected toward the front of the frame through the medium of springs 29. The springs are arranged on the sides of the inner yokes 17 and depending brackets 30 on the sides of the tracks 7. Thus, when the hook locking member 15 engages the openings in the arms 24, 26 and 27, the spring exerting a pressure against the flexible frame, and likewise against a bar 31 that connects the outer yoke members 17, will hold the rods 12 in parallelism and the net effectively locked in retracted position. As stated, the breaking of the joint between the bars 12 will move the hook carrying locking element 15 rearwardly, such movement releasing the arm 24 to permit the same being influenced by its spring 25 in a direction toward the axle 1. The member 15 will drop to the ground, and the springs 29 will move the net longitudinally and outwardly on the rails 7. The net will be expanded laterally when the same reaches the outer end of the track carrying frame, and the flexible connections between the yokes 17 will hold the net longitudinally taut, the spreading of the net at the outer portion thereof holding the same laterally taut.

My improvement may be readily attached to any make of automobiles or like vehicles and is of a nature which will not detract from the appearance of the car, but rather add to the ornamentality thereof. The locking means is sensitive so that a comparatively slight pressure against either of the bars 12 will release the same. The springs will move the net to obstacle receiving position with rapidity, and any obstacle landing in the net will be firmly supported thereon. The strength of the construction insures the device as well as the automobile from injury regardless of the weight of the obstacle received in the net and the net being likewise of great strength will effectively support such obstacle.

I have herein set forth an approved embodiment of my invention as it now appears to me, but I may, at a later date, desire to make changes therefrom. Therefore, I am not to be restricted to the structural embodiment herein set forth and am entitled to all such changes therefrom as fairly fall within the scope of my claims.

The rods 15 are constructed of sections which are pivotally associated, as indicated by the numeral 50. The sections are provided with depending lugs to which are attached the ends of a spring 51. The spring at all times exerts a tension between the lugs and consequently between the rod sections so that the downward swinging of the inner and longer rod section, at the proper time, is assured, and whereby the said rod cannot interfere with the outward movement of the net.

Having described the invention, I claim:—

1. In combination with an automobile or like vehicle, of a fender therefor, comprising a net normally housed beneath the body of the automobile, a frame on which the net is guided projecting beyond the front of the automobile, breakable means at the front of the frame for locking the net in said mentioned position and susceptible to movement when contacted to release the net, and spring means for influencing the net to an outer position on the frame when the said breakable means is so actuated.

2. The combination with an automobile or similar vehicle, of a frame comprising channeled side members and an outer connecting member secured to the side members and to the front axle of the automobile, a net, a flexible frame on the sides thereof, roller carrying members secured thereto and the rollers of the said members received in the channeled sides of the frame, pivotally supported breakable means at the front of the frame, a movable element carried thereby engageable with the net for holding the same normally beneath the body of the automobile, and spring means for moving the net longitudinally in an outward direction when the said breakable means is actuated.

3. In combination with an automobile or like vehicle, of a fender therefor, including a frame having channeled side members secured to the frame and to the front axle of the automobile, said side members having their outer portions rounded outwardly from each other, wing guards between the mudguards and the side members of the frame, a net having front and rear buffers, flexible frames to which the sides of the net are connected, yokes secured to the frame, flexible spacing means for the yokes, rollers journaled on the yokes and received in the channeled sides of the frame, pivotally supported rods carried at the outer end of the frame and having their confronting ends slotted and disposed in lapping relation, a hook carrying rod having a pivot passing through the slots of the first mentioned rods, arms on the front buffer of the net, a spring influenced pivoted arm on the front axle of the automobile designed to be swung against the first mentioned arms when the net is arranged at the rear of the front axle and to receive the hooked end of the rod therethrough, and coiled springs between the rear yokes and the sides of the frame for influencing the net outwardly on the frame when the hook is moved to unlocking position by the pressure of contact on the slotted rods.

4. A fender for automobiles or the like comprising an expansible net guided and normally supported beneath the body of an automobile, spring means for influencing the net outwardly beyond the front of the automobile, pivotally supported breakable means on the outer ends of the guides for the net, a rod loosely associated with said means and engaging the net for holding the same in normal inward position, means supporting the rod in such position and designed to release the same when the breakable means are broken, and said rod comprising two pivoted sections spring influenced whereby the net engaging section will be moved downwardly with respect to the said net when the releasing means therefor are actuated.

In testimony whereof I affix my signature.

THOMAS SPEZIO.